US012217757B2

United States Patent
Laskowski et al.

(10) Patent No.: US 12,217,757 B2
(45) Date of Patent: Feb. 4, 2025

(54) VOICE RECOGNITION NOTETAKER

(71) Applicant: Panasonic Automotive Systems Company of America, Division of Panasonic Corporation of North America, Peachtree City, GA (US)

(72) Inventors: Garrett Laskowski, Linden, MI (US); Padhu Kanagaraj, Farmington Hills, MI (US)

(73) Assignee: Panasonic Automotive Systems Company of America, Division of Panasonic Corporation of North America, Peachtree City, GA (US)

( * ) Notice: Subject to any disclaimer, the term of this patent is extended or adjusted under 35 U.S.C. 154(b) by 426 days.

(21) Appl. No.: 17/548,240

(22) Filed: Dec. 10, 2021

(65) Prior Publication Data

US 2022/0189485 A1 Jun. 16, 2022

Related U.S. Application Data

(60) Provisional application No. 63/125,811, filed on Dec. 15, 2020.

(51) Int. Cl.
| | | |
|---|---|---|
| *G10L 15/26* | (2006.01) | |
| *B60R 16/037* | (2006.01) | |
| *G10L 15/22* | (2006.01) | |
| *H04M 1/60* | (2006.01) | |
| *H04M 1/72409* | (2021.01) | |
| *H04M 1/72412* | (2021.01) | |
| *H04M 1/72433* | (2021.01) | |

(52) U.S. Cl.
CPC .......... *G10L 15/26* (2013.01); *B60R 16/0373* (2013.01); *G10L 15/22* (2013.01); *H04M 1/6091* (2013.01); *H04M 1/724098* (2022.02); *H04M 1/72412* (2021.01); *H04M 1/72433* (2021.01); *G10L 2015/223* (2013.01)

(58) Field of Classification Search
CPC ......... G10L 15/00; G10L 15/26; G10L 15/22; G10L 2015/223; G06F 3/167; G06F 3/165; G06F 3/0484; G06F 16/951; H04M 1/6091; H04M 1/724098; H04M 1/72412; H04M 1/72433; H04M 1/6075; H04M 1/64; H04M 1/271; H04M 2250/74; B60R 16/0373; B60R 16/037; H04L 67/12; G01C 21/362; B60K 35/00
USPC .............. 704/231, 233, 235, 15.043, 19.007, 704/13.001; 381/302, 71.4, 86; 700/94
See application file for complete search history.

(56) References Cited

U.S. PATENT DOCUMENTS

2010/0254521 A1* 10/2010 Kriese ................. H04M 1/6075
704/235
2017/0185052 A1* 6/2017 Wang .................. G06Q 20/384

FOREIGN PATENT DOCUMENTS

CN 112637429 A * 4/2021

* cited by examiner

*Primary Examiner* — Leshui Zhang
(74) *Attorney, Agent, or Firm* — Laurence S. Roach, Esq.

(57) ABSTRACT

A recording system for a motor vehicle includes a communication interface receiving an audio feed from a telephone. A voice recognition module is communicatively coupled to the communication interface and responds to a command from a human user by converting at least a portion of the audio feed from the telephone into text data, and storing the text data in a memory device.

18 Claims, 2 Drawing Sheets

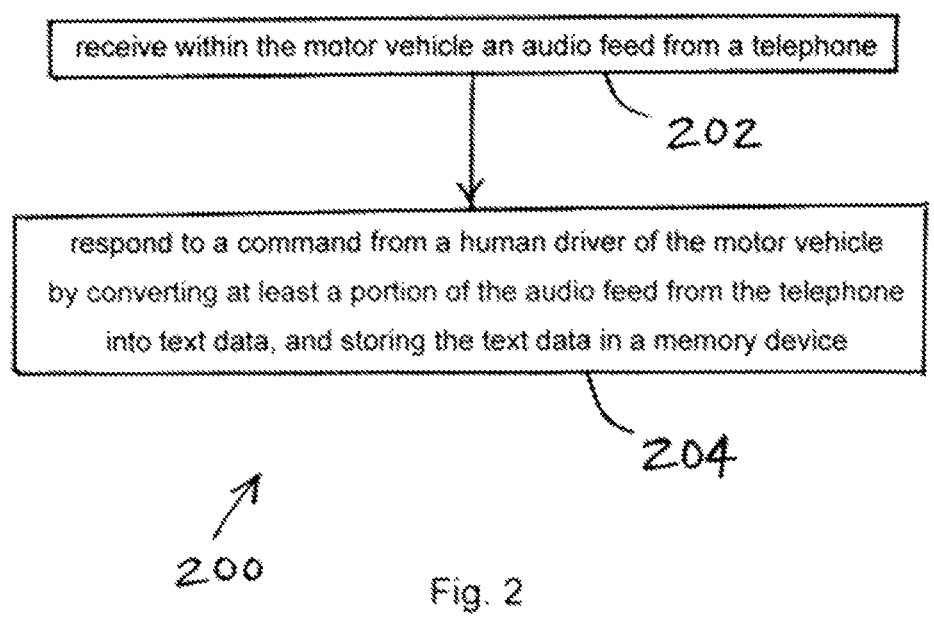

VOICE RECOGNITION NOTETAKER

CROSS-REFERENCED TO RELATED APPLICATIONS

This application claims benefit of U.S. Provisional Application No. 63/125,811, filed on Dec. 15, 2020, the disclosure of which is hereby incorporated by reference in its entirety for all purposes.

BACKGROUND OF THE INVENTION

1. Field of the Invention

The present invention relates to a notetaking system, and, more particularly, to a notetaking system in a motor vehicle.

2. Description of the Related Art

While a driver of a motor vehicle is on a telephone call, the "far end" talker (e.g., the remotely disposed person that the person in the vehicle is talking to) may provide an important sequence of steps, addresses, phone numbers, confirmation numbers, etc. The driver has no ability to safely save the information without taking their eyes off the road. That is, while driving, the driver has no ability to safely write messages, phone numbers, addresses, etc.

SUMMARY OF THE INVENTION

The invention may use the voice recognition (VR) engine present in most vehicles today to record responses from the "far end" talker during a hands-free phone call. The invention may provide automatic translation from speech to text of important information provided by the "far end" talker.

In one embodiment, the driver presses a VR notetaker system pushbutton (which may be present on the steering wheel or HMI) before the information is provided in order for the VR engine to translate the speech to text and save the text. The driver may then press the pushbutton again to deactivate the VR notetaker system.

The text may be stored in the infotainment control unit. The control unit can then send the text to the driver via any of various communication methods. For example, the text may be sent to the driver via a personal cloud arrangement, email, text message, mobile phone app, etc.

The far end audio may be routed from the hands-free library input to the voice recognition engine in the head unit. This is a non-traditional audio routing.

During a phone call, when the driver activates the VR notetaker system (for example, by pressing a VR steering wheel pushbutton), the far end audio (also called "downlink") may be routed from the Bluetooth audio stream (either pre- or post-hands-free processing) to the VR engine. The VR engine may then translate the speech to text until the driver deactivates the VR notetaker system. The VR engine may then transfer the translated text to the information control unit to store. The System on Chip (SoC) may then retrieve and store the far end talker's information (name/company) and link it to, and in association with, the stored information from the VR engine. The SoC can retrieve this far end talker information over Bluetooth or USB (CarPlay/Android Auto) from the stored phone contact, caller ID, Google number info, etc. The driver can then retrieve this information through multiple methods including text messages, email, text-to-speech to read back the information, etc. These options can be activated through the HMI on the information control unit.

The invention comprises, in one form thereof, a recording system for a motor vehicle, including a communication interface receiving an audio feed from a telephone. A voice recognition module is communicatively coupled to the communication interface and responds to a command from a human user by converting at least a portion of the audio feed from the telephone into text data, and storing the text data in a memory device.

The invention comprises, in another form thereof, a recording method for a motor vehicle, including receiving within the motor vehicle an audio feed from a telephone. In response to a command from a human driver of the motor vehicle, at least a portion of the audio feed from the telephone is converted into text data. The text data is stored in a memory device.

The invention comprises, in yet another form thereof, a recording system for a motor vehicle, including a communication interface receiving an audio feed from a telephone. A switch may be actuated by a human driver of the motor vehicle. A voice recognition module is communicatively coupled to the communication interface and to the switch. The voice recognition module responds to an actuation of the switch by converting at least a portion of the audio feed from the telephone into text data, and storing the text data in a memory device.

An advantage of the invention is that it enables a driver to record information from a telephone conversation with minimal distraction from the driving task.

BRIEF DESCRIPTION OF THE DRAWINGS

The above-mentioned and other features and objects of this invention, and the manner of attaining them, will become more apparent and the invention itself will be better understood by reference to the following description of embodiments of the invention taken in conjunction with the accompanying drawings, wherein:

FIG. 2 is a flow chart of one embodiment of a recording method of the present invention for a motor vehicle.

DETAILED DESCRIPTION

Figure 1:
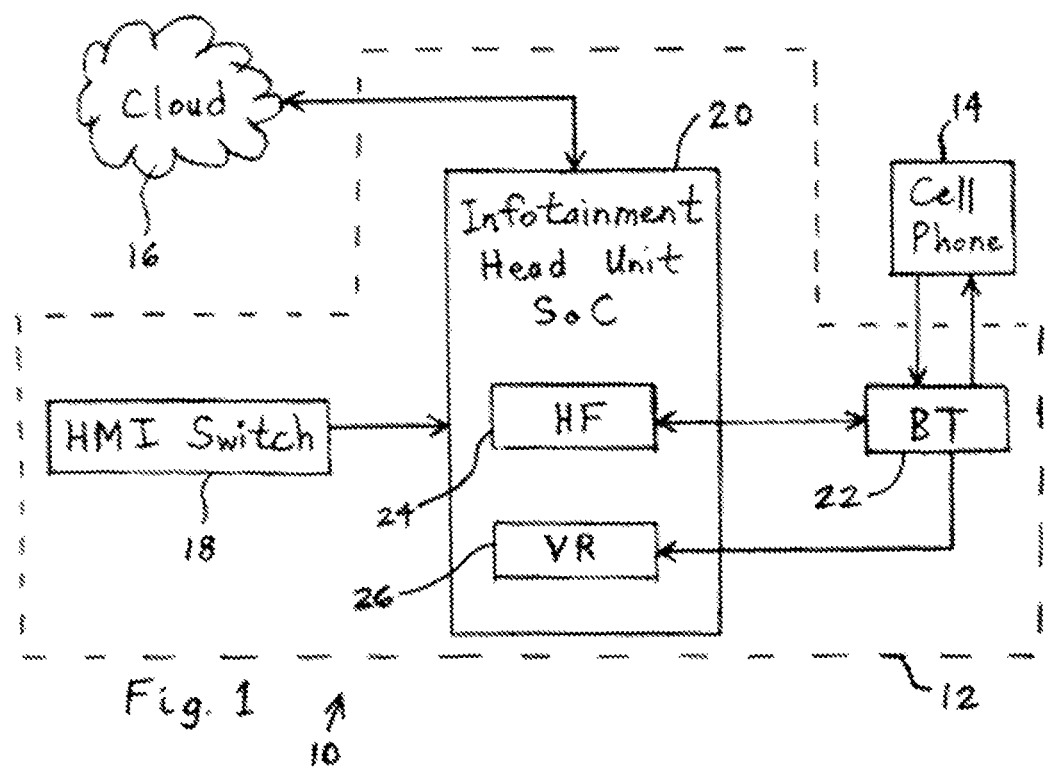
FIG. 1 is a block diagram of one embodiment of a vehicle voice recognition notetaker arrangement of the present invention.

The embodiments hereinafter disclosed are not intended to be exhaustive or limit the invention to the precise forms disclosed in the following description. Rather the embodiments are chosen and described so that others skilled in the art may utilize its teachings.

FIG. 1 illustrates one embodiment of a vehicle voice recognition notetaker arrangement 10 of the present invention, including a motor vehicle 12 in wireless communication with a mobile cellular telephone 14 and a cloud-based memory system 16. Phone 14 may belong to and be carried by a human driver of vehicle 12, and may be disposed within vehicle 12 during operation of arrangement 10. Cloud-based memory system 16 may include computer servers and memory devices in communication with the Internet.

Motor vehicle 12 includes a human machine interface (HMI) switch 18, an infotainment head unit system on chip (SoC) 20, and a Bluetooth wireless communication module 22. SoC 20 includes a hands-free module 24 and a voice recognition module or engine 26.

During use, a driver of vehicle 12 may talk to another person on the driver's cell phone 14. The driver may activate hands-free module 24 and Bluetooth module 22 in order to carry on the conversation in a hands-free manner (e.g., without having to touch phone 14) by use of built-in speakers and microphones within vehicle 12.

When the driver wants to record something that the other person is about to say, he may actuate switch 18, such as by pressing a pushbutton. In response to the actuation of switch 18, voice recognition module 26 may begin to receive an audio feed from Bluetooth module 22. The audio feed from Bluetooth module 22 may include what the other person on the phone conversation is saying to the driver of vehicle 12. The audio feed from Bluetooth module 22 may also include what the driver of vehicle 12 is saying. Voice recognition module 26 may convert the audio feed to text, and the converted text may be stored in memory in cloud 16 in association with the time and date of the conversation. It is also possible for the converted text to be stored in a memory device disposed within vehicle 12.

When the driver retrieves the text stored in memory in cloud 16, the text may be sent to his cell phone 14 via hands free module 24 and Bluetooth module 22. Alternatively, the text may be presented on a display screen that is permanently installed within vehicle 12.

FIG. 2 illustrates one embodiment of a recording method 200 of the present invention for a motor vehicle. In step 202, an audio feed from a telephone is received within the motor vehicle. For example, driver of vehicle 12 may talk to another person on the driver's cell phone 14. The driver may activate hands-free module 24 and Bluetooth module 22 in order for hands-free module 24 to receive an audio feed from phone 14 and enable the driver to carry on the conversation in a hands-free manner.

Next, in step 204, a command from a human driver of the motor vehicle is responded to by converting at least a portion of the audio feed from the telephone into text data, and storing the text data in a memory device. For example, in response to a command in the form of the driver actuating of switch 18, voice recognition module 26 may receive the audio feed and convert the audio feed to text, and the converted text may be stored in memory in cloud 16 or in a memory device disposed within vehicle 12.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A recording system for a motor vehicle, the recording system comprising:
   a communication interface configured to receive an audio feed from a telephone; and
   a voice recognition module communicatively coupled to the communication interface and configured to respond to a command from a human user by:
      converting only speech by another person that the human user is talking to on the telephone into text data; and
      storing the text data in a memory device.

2. The recording system of claim 1 wherein the communication interface comprises a Bluetooth module.

3. The recording system of claim 1 wherein the telephone comprises a mobile cellular telephone.

4. The recording system of claim 1 further comprising a switch, wherein the voice recognition module receives the command from a human user as a result of the human user actuating the switch.

5. The recording system of claim 1 wherein the memory device is disposed remote from the motor vehicle.

6. The recording system of claim 1 wherein the memory device is configured to send the stored text data to the human user via a personal cloud arrangement, email, text message, or mobile phone application.

7. A recording method for a motor vehicle, the recording method comprising:
   receiving within the motor vehicle an audio feed from a telephone; and
   responding to the command from the human driver by:
      converting only speech by another person that the human driver is talking to on the telephone into text data; and
      storing the text data in a memory device.

8. The recording method of claim 7 wherein the audio feed from the telephone is received via a Bluetooth module.

9. The recording method of claim 7 wherein the telephone comprises a mobile cellular telephone.

10. The recording method of claim 7 wherein the responding step includes responding to the human driver actuating a switch.

11. The recording method of claim 7 wherein the memory device is disposed at a location remote from the motor vehicle.

12. The recording method of claim 7 further comprising sending the stored text data to the human driver via a personal cloud arrangement, email, text message, or mobile phone application.

13. The recording method of claim 7 further comprising routing far end audio from a hands-free library input to a voice recognition module, the far end audio being produced by another person that the human driver is talking to on the telephone.

14. A recording system for a motor vehicle, the recording system comprising:
   a communication interface configured to receive an audio feed from a telephone; a switch configured to be actuated by a human driver of the motor vehicle; and
   a voice recognition module communicatively coupled to the communication interface and to the switch, the voice recognition module being configured to respond to actuation of the switch by:
      converting only speech by another person that the human user is talking to on the telephone into text data; and
      storing the text data in a memory device.

15. The recording system of claim 14 wherein the communication interface comprises a Bluetooth module.

16. The recording system of claim 14 wherein the telephone comprises a mobile cellular telephone.

17. The recording system of claim 14 wherein the memory device is disposed remote from the motor vehicle.

18. The recording system of claim 14 wherein the memory device is configured to send the stored text data to the human user via a personal cloud arrangement, email, text message, or mobile phone application.

* * * * *